(12) United States Patent
Yamanashi (10) Patent No.: US 6,342,972 B1
(45) Date of Patent: Jan. 29, 2002

(54) WIDE-ANGLE ZOOM LENS SYSTEM

(75) Inventor: Takanori Yamanashi, Kokubunji (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

(21) Appl. No.: 09/556,960

(22) Filed: Apr. 21, 2000

(30) Foreign Application Priority Data

Apr. 22, 1999 (JP) .......................................... 11-115030

(51) Int. Cl.$^7$ ........................ G02B 15/14; G02B 13/02; G02B 13/04; G02B 9/34
(52) U.S. Cl. ...................... 359/686; 359/745; 359/749; 359/771; 359/772; 359/773
(58) Field of Search ............................... 359/686, 745, 359/749, 771, 772, 773

(56) References Cited

U.S. PATENT DOCUMENTS

| | | | | |
|---|---|---|---|---|
| 4,822,152 A | | 4/1989 | Yamanashi | 359/686 |
| 5,687,401 A | * | 11/1997 | Kawamura | 396/79 |
| 5,909,319 A | * | 6/1999 | Matsui | 359/693 |

* cited by examiner

Primary Examiner—Georgia Epps
Assistant Examiner—Michael A. Lucas
(74) Attorney, Agent, or Firm—Pillsbury Winthrop LLP (57) ABSTRACT

A wide-angle zoom lens system having a short optical total length not only at the wide-angle end but also at the telephoto end and a reduced telephoto ratio despite the fact that it has a high zoom ratio, with a view to achieving a reduction in size of cameras. The zoom lens system has a first lens unit G1 of positive refractive power, a second lens unit G2 of negative refractive power, a third lens unit G3 of positive refractive power, and a fourth lens unit G4 of negative refractive power. When the zoom lens system is zoomed from the wide-angle side to the telephoto side, each of the lens units moves toward the object side such that the space between the first lens unit G1 and the second lens unit G2 increases, whereas the space between the third lens unit G3 and the fourth lens unit G4 decreases. The zoom lens system satisfies a condition concerning the focal lengths of the first lens unit G1 and the fourth lens unit G4, a condition concerning the amount of movement of the fourth lens unit G4 and a condition concerning the zoom ratio assigned to the fourth lens unit G4.

19 Claims, 8 Drawing Sheets

WIDE-ANGLE ZOOM LENS SYSTEM

BACKGROUND OF THE INVENTION

The present invention relates to wide-angle zoom lens systems. More particularly, the present invention relates to a wide-angle zoom lens system having a short optical total length not only at the wide-angle end but also at the telephoto end and a reduced telephoto ratio despite the fact that it has a high zoom ratio.

There has heretofore been a general tendency for zoom lens systems with a relatively low zoom ratio to use a two-unit zoom lens structure and for zoom lens systems requiring a higher zoom ratio to use a three-unit zoom lens structure. There are many variations on the zoom type of these conventional zoom lens systems. However, development of such variations has resulted in an increase in the number of lens units. To minimize the number of lens units or the number of constituent lens elements, some of the variations adopt a method wherein the aperture ratio at the telephoto end is set at a relatively small value and an aspherical surface is used.

Meanwhile, a four-unit zoom lens system for a compact camera is disclosed in U.S. Pat. No. 4,822,152 by the present applicant. The zoom lens system of U.S. Pat. No. 4,822,152 has, in order from the object side, a first lens unit of positive refractive power, a second lens unit of negative refractive power, a third lens unit of positive refractive power, and a fourth lens unit of negative refractive power. When the zoom lens system is zoomed from the wide-angle end to the telephoto end, each of the lens units moves toward the object side.

The feature of the above zoom lens system resides in that all the lens units are moved to share the load of attaining a high zoom ratio. When the zoom lens system is zoomed from the wide-angle end to the telephoto end, the second lens unit is moved toward the object side, thereby attaining a reduction in size at the wide-angle end.

There have heretofore been made many propositions that an aspherical surface is used to attain a compact lens system. Attempts have also been made to reduce the number of lens elements constituting one lens unit by increasing the aberration correcting power assigned to an aspherical surface. There have also been proposed a large number of zoom lens systems that use a radial type gradient index lens.

Many of the actual zoom lens systems for compact cameras have a mechanism that allows the lens system to be stored in the camera body irrespective of the type of zoom lens systems. That is, the lens system is moved into the camera body by a collapsible lens barrel mechanism that is provided in a space remaining when the lens position is at the wide-angle end, at which the overall length of the lens system is the shortest, thereby realizing a reduction in size of the camera when the lens system is in the collapsed storage position.

However, when photography is actually performed, the lens system is placed in the position for forming the original optical system. Therefore, in the case of a high-zoom ratio zoom lens system, the lens barrel becomes very long because of a large amount of lens movement for zooming to the telephoto end, and the center of gravity also shifts. Accordingly, the entire optical system tends to be decentered undesirably.

SUMMARY OF THE INVENTION

In view of the above-described problems, an object of the present invention is to provide a wide-angle zoom lens system having a short optical total length not only at the wide-angle end but also at the telephoto end and a reduced telephoto ratio despite the fact that it has a high zoom ratio, with a view to achieving a reduction in size of cameras.

To attain the above-described object, the present invention provides a wide-angle zoom lens system having, in order from the object side, a first lens unit of positive refractive power, a second lens unit of negative refractive power, a third lens unit of positive refractive power, and a fourth lens unit of negative refractive power. When the zoom lens system is zoomed from the wide-angle side to the telephoto side, each of the lens units moves toward the object side such that the space between the first lens unit and the second lens unit increases, whereas the space between the third lens unit and the fourth lens unit decreases. The wide-angle zoom lens system satisfies the following conditions:

$$0.7 < f_1/f_W < 3.5 \quad (1)$$

$$0.15 < |f_4|/f_W < 0.7 \quad (2)$$

$$0.2 < \Delta X_{4T}/f_T < 0.65 \quad (3)$$

$$2.5 < \beta_{4T}/\beta_{4W} < 6.0 \quad (4)$$

where $f_1$ is the focal length of the first lens unit; $f_W$ is the focal length at the wide-angle end of the wide-angle zoom lens system; $f_4$ is the focal length of the fourth lens unit; $f_T$ is the focal length at the telephoto end of the wide-angle zoom lens system; $\Delta X_{4T}$ is the amount of movement of the fourth lens unit for zooming from the wide-angle end to the telephoto end; $\beta_{4T}$ is the lateral magnification at the telephoto end of the fourth lens unit; and $\beta_{4W}$ is the lateral magnification at the wide-angle end of the fourth lens unit.

In this case, it is desirable that the first lens unit include at least one positive lens and one doublet consisting of a positive lens and a negative lens, and the second lens unit include at least one negative lens, and further the third lens unit include at least one doublet consisting of a negative lens and a positive lens, and further the fourth lens unit include at least a negative lens and a positive lens.

It is desirable that any one or more of the first to fourth lens units have at least one aspherical surface.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

DESCRIPTION OF THE PREFERRED EMBODIMENTS

With a view to achieving a reduction in size of the conventional zoom compact cameras, the present invention allows a lens system with a high zoom ratio to be accommodated in a small-sized camera by reducing the size of the optical system.

There has heretofore been a general tendency for zoom lens systems with a relatively low zoom ratio to use a two-unit zoom lens structure and for zoom lens systems requiring a higher zoom ratio to use a three-unit zoom lens structure. There are many variations on the zoom type of these conventional zoom lens systems. However, development of such variations has resulted in an increase in the number of lens units. To simplify the lens arrangement, a method has already been proposed in which the aperture ratio at the telephoto end is set at a relatively small value and an aspherical surface is used. With this method, the size of the lens system is small at the wide-angle end and when the lens barrel is collapsed. However, the amount of movement of the lens units for zooming to the telephoto end is unfavorably large.

The amount of movement of the lens units depends mainly on the zoom ratio and the focal length of each variable-magnification part. Accordingly, if the amount of movement of the lens system is reduced without giving any special consideration to the lens arrangement, the distance to the telephoto end becomes short, and the zoom ratio itself unavoidably reduces. Therefore, it is necessary in the paraxial design to increase the zooming efficiency of the final lens unit of negative refractive power disposed closest to the image side, which is a principal variable-magnification part. As a result, it becomes possible to reduce the amount of movement of the final lens unit during zooming. The problem arising in this case is that the power of the lens units becomes strong. This makes it very difficult to maintain high image-forming performance with a conventional aberration correcting device.

At the telephoto end, in particular, the telephoto ratio, which is an index of reduction in size, is reduced. Consequently, it is supposed to be very difficult to correct aberrations, as is well known. Under such circumstances, an optimum power distribution and an optimum lens arrangement are required. Furthermore, because the telephoto ratio of a wide-angle zoom lens system is reduced, which makes it difficult to correct aberrations, it is necessary to perform effective aberration correction by utilizing the properties of an optical element.

With respect to the above-described three-unit zoom lens system, it is known that aberration correction can be effected easily in a case where an approximately symmetric lens arrangement can be constructed by forming the second lens unit from a front unit and a rear unit. When the second lens unit is formed from a single lens unit, the power of the final lens unit needs to be increased in regard to the occurrence of distortion. Moreover, because only this lens unit has a negative power, there is a strong tendency for pincushion distortion to occur.

The challenge to zoom lens systems for compact cameras is to achieve a high aperture ratio and a high zoom ratio. Achievement of a high aperture ratio and achievement of a high zoom ratio are technical problems similarly necessary to solve in order to obtain stable and favorable performance. In particular, in order to ensure the required performance and stability of the image surface at intermediate focal lengths, i.e. to maintain favorable performance throughout a wide zooming range, a technique for suppressing variations in the curvature of field due to zooming is required.

In the present invention, to realize as high a zoom ratio as 4 or more, the zoom lens system is formed from four lens units, and the second and third lens units are moved independently, thereby allowing correction of variations in the curvature of field in the intermediate focal length region.

More specifically, the wide-angle zoom lens system according to the present invention has, in order from the object side, a first lens unit of positive refractive power, a second lens unit of negative refractive power, a third lens unit of positive refractive power, and a fourth lens unit of negative refractive power. When the zoom lens system is zoomed from the wide-angle side to the telephoto side, each of the lens units moves toward the object side such that the space between the first lens unit and the second lens unit increases, whereas the space between the third lens unit and the fourth lens unit decreases. In addition, the wide-angle zoom lens system satisfies the following condition:

$$0.7 < f_1/f_W < 3.5 \qquad (1)$$

where $f_1$ is the focal length of the first lens unit, and $f_W$ is the focal length at the wide-angle end of the wide-angle zoom lens system.

The condition (1) is an important condition for achieving a wide field angle. If $f_1/f_W$ is not larger than the lower limit, i.e. 0.7, the focal length of the first lens unit becomes small, resulting in a power distribution favorable for a size reduction. However, it becomes difficult to correct aberrations when it is intended to obtain a super-wide field angle beyond the wide-angle end. In addition, the number of constituent lens elements increases unnecessarily. This is unfavorable from the viewpoint of achieving a reduction in size. If $f_1/f_W$ is not smaller than the upper limit, i.e. 3.5, although the arrangement is actually advantageous from the viewpoint of aberration correction, the amount of lens movement for zooming increases undesirably (although it depends on the condition (3) as described later), which goes against the achievement of a reduction in size, unfavorably.

It is desirable that the first lens unit include at least one single lens and one doublet consisting of a positive lens and a negative lens, and the second lens unit include at least one negative lens, and further the third lens unit include at least one doublet consisting of a negative lens and a positive lens, and further the fourth lens unit include at least a negative lens and a positive lens. This zoom lens system is designed so that the overall length of the lens system is shortest at the wide-angle side, and at the wide-angle end, focusing is effected, for example, by moving the second and third lens units as one unit. Accordingly, the amount of lens movement for focusing is favorably small, and there is no need to leave an unnecessarily large surplus space between the first and second lens units. Thus, the efficiency is improved, and the size can be reduced. During zooming to the telephoto side, the space between the first and second lens units widens. Therefore, if the amount of lens movement for focusing increases at the telephoto side, it is unnecessary to consider mechanical interference. On the other hand, the effect of the space between the third and fourth lens units on the image plane tends to heighten. Accordingly, it is necessary to ensure the required accuracy.

Therefore, it is important in the present invention to satisfy the following conditions.

$$0.15 < |f_4|/f_W < 0.7 \quad (2)$$

$$0.2 < \Delta X_{4T}/f_T < 0.65 \quad (3)$$

$$2.5 < \beta_{4T}/\beta_{4W} < 6.0 \quad (4)$$

where $f_W$ is the focal length at the wide-angle end of the wide-angle zoom lens system; $f_4$ is the focal length of the fourth lens unit; $f_T$ is the focal length at the telephoto end of the wide-angle zoom lens system; $\Delta X_{4T}$ is the amount of movement of the fourth lens unit for zooming from the wide-angle end to the telephoto end; $\beta_{4T}$ is the lateral magnification at the telephoto end of the fourth lens unit; and $\beta_{4W}$ is the lateral magnification at the wide-angle end of the fourth lens unit.

The condition (2) defines the power of the fourth lens unit. If $|f_4|/f_W$ is not larger than the lower limit, i.e. 0.15, the power of the fourth lens unit becomes unnecessarily strong, and it becomes difficult to correct aberrations although the amount of lens movement for zooming reduces and the overall length of the lens system at the telephoto end reduces. If $|f_4|/f_W$ is not smaller than the upper limit, i.e. 0.7, although this is favorable from the viewpoint of aberration correction, the amount of lens movement for zooming increases unfavorably, and it becomes difficult to ensure the required back focus at the wide-angle end.

It is necessary to satisfy the condition (3) in order to minimize the amount of movement of the entire system in the case of achieving a high zoom ratio. It is necessary to increase the power of the fourth lens unit in order to obtain a zoom lens system that is compact in size while having a high zoom ratio. If $\Delta X_{4T}/f_T$ is not smaller than the upper limit of the condition (3), i.e. 0.65, the overall length of the lens system at the telephoto end becomes approximately the same as that of the conventional small-sized zoom lens systems, which runs counter to the spirit of the present invention. If $\Delta X_{4T}/f_T$ is not larger than the lower limit, i.e. 0.2, although this is favorable from the viewpoint of achieving a reduction in size, it becomes very difficult to correct aberrations and hence impossible to attain the desired image-forming performance.

The condition (4) relates to the achievement of an increase in zoom ratio of the zoom lens system according to the present invention. The condition (4) defines the zoom ratio assigned to the fourth lens unit. If $\beta_{4T}/\beta_{4W}$ is not larger than the lower limit of the condition, i.e. 2.5, the zooming range of the zoom lens system becomes so narrow as to be attainable by a zoom system with a simpler arrangement. Therefore, the resulting zoom lens system does not serve the purpose of the present invention. If $\beta_{4T}/\beta_{4W}$ is not smaller than the upper limit, i.e. 6.0, it becomes difficult to realize the amount of lens movement for zooming within the range defined by the condition (1) and to maintain the required image-forming performance even if it is possible to obtain a solution to the paraxial design. Accordingly, favorable results cannot be obtained.

After the power distribution among the lens units has been determined, it is necessary to devise a lens arrangement appropriate for the power distribution. In this case, it is required that the first lens unit include at least one single positive lens and one doublet consisting of a positive lens and a negative lens, and the second lens unit include an aperture stop and at least one negative lens, and further the third lens unit include at least one doublet consisting of a negative lens and a positive lens, and further the fourth lens unit include at least a negative lens and a positive lens. To suppress aberration variations during zooming and those during focusing, it is desirable to form each lens unit from at least a positive lens and a negative lens so as to minimize various aberrations and chromatic aberration produced in each lens unit. This will be described below more specifically.

In view of image-forming performance, it is necessary to devise an optimum lens arrangement for the desired performance. Needless to say, a specific combination of a lens arrangement and optical elements is actually needed to maintain the required image-forming performance. In the present invention, the first lens unit is formed from at least a single positive lens and a doublet consisting of a positive lens and a negative lens. By using at least one aspherical surface, it becomes possible to favorably correct spherical aberration in the telephoto region. When it is necessary to achieve a lens system of wider field angle and smaller size, it is preferable to form the first lens unit from a positive lens, a cemented doublet, and a positive meniscus lens. To correct curvature of field and distortion in the wide-angle region in addition to spherical aberration at the telephoto end, an air lens should preferably be interposed between the positive first lens and the cemented doublet. By doing so, remarkable aberration correcting effects can be obtained.

If an aspherical surface is used for the higher-order aberration producing surface of the air lens, even more remarkable effects can be obtained. In the case of realizing a high-zoom ratio zoom lens system including a zooming range from a wide-angle position to a telephoto position as in Example 4 (described later), if a material having anomalous dispersion is used in the first lens unit, it is possible to expect that chromatic aberration can be corrected effectively.

The second lens unit includes an aperture stop and at least one negative lens. It is desirable to use at least one aspherical surface in the second lens unit. It is desirable to move the second and third lens units as one unit during focusing. Although the amount of movement of these lens units for focusing is small, it is desirable to correct these lens units for aberrations so that the amount of residual aberration in each individual lens unit is sufficiently small. The position of the aperture stop may be on the object side of the second lens unit or behind the second lens unit or in front of the third lens unit. The position of the aperture stop affects the lens outer diameters of the first and fourth lens units. Needless to say, optimum lens arrangements for the second and third lens units vary according to the position of the aperture stop.

The following is a description of the arrangement of the fourth lens unit, which is extremely important for the present invention to be put to practical use. The fourth lens unit needs at least one positive lens and one negative lens. When the numerical value of the condition (2) is small, it is desirable from the viewpoint of aberration correction that the fourth lens unit include three lens elements, i.e. a negative lens, a positive lens, and a negative lens. This arrangement is particularly important in order to maintain the image-forming performance for the periphery of the image field at the wide-angle side. There are cases where even more favorable results are obtained if the above-described one negative lens and one positive lens are formed into a cemented lens to achieve a reduction in size at the wide-angle side and to suppress higher-order aberrations produced by an extra-axial light beam at the wide-angle end.

In addition, it becomes easy to realize an optical system capable of ensuring image-forming performance at the wide-angle side by using at least one or two aspherical surfaces, for example, using an aspherical surface for the object-side concave surface of the negative lens. An aspherical surface used for this portion, in particular, causes the aspheric quantity to increase because it relates to the performance for the periphery of the image field in the wide-angle region.

In view of the above, it is necessary to meet the following requirements in order to realize the optical system according to the present invention. That is, the first lens unit of positive refractive power should have at least one aspherical surface, and the fourth lens unit of negative refractive power should have at least one aspherical surface. It is desirable for the fourth lens unit to use two aspherical surfaces.

These conditions need to be satisfied in order to ensure the aberration correcting performance of the optical system by combination of the conditions. In particular, it is extremely important to make effective use of an aspherical surface in the first lens unit for the purpose of correcting spherical aberration and to use an aspherical surface in the third lens unit effectively for the purpose of obtaining the flatness of the image surface in the wide-angle region. If the second lens unit includes a lens group for controlling curvature of field, higher performance can be expected. This will be shown in the following examples.

Examples 1 to 4 of the present invention will be described below.

EXAMPLE 1

Figure 1:
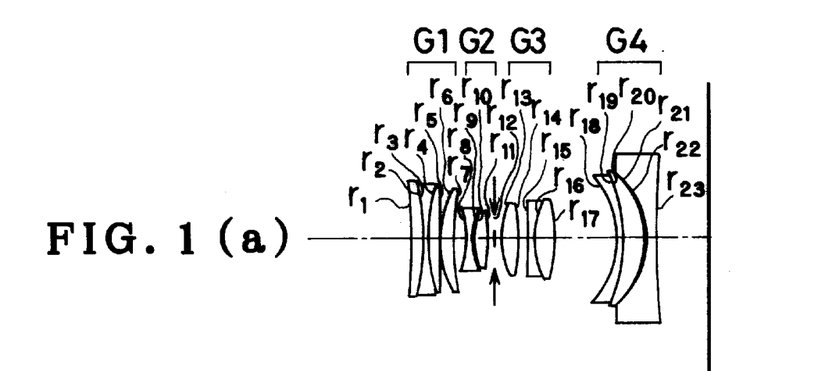
FIG. 1 is a sectional view of a lens system according to Example 1 of the present invention.

Example 1 is a wide-angle zoom lens system having a focal length ranging from 29.1 to 115 millimeters and an aperture ratio of 1:4.47 to 15.2. The lens arrangement of the zoom lens system according to this example is shown in FIG. 1. In FIG. 1: part (a) is a sectional view of the lens arrangement at the wide-angle end; part (b) is a sectional view of the lens arrangement at an intermediate position; and part (c) is a sectional view of the lens arrangement at the telephoto end (the same shall apply to the following sectional views of lens arrangements).

The lens arrangement of this example is as follows: A first lens unit G1 includes a positive meniscus lens having a concave surface directed toward the object side and a doublet consisting of a biconcave negative lens and a positive meniscus lens having a convex surface directed toward the object side. The first lens unit G1 further includes a positive meniscus lens having a convex surface directed toward the object side. An aspherical surface is used for the image-side surface of the positive meniscus lens closest to the object side. An aspherical surface is also used for the object-side surface of the positive meniscus lens closest to the image side. These two aspherical surfaces simultaneously correct off-axis comatic aberration in addition to spherical aberration. The space between the positive meniscus lens closest to the object side and the cemented doublet is formed by an air lens. This is effective in correcting aberrations.

In order to shorten the overall length of the wide-angle zoom lens system and, at the same time, to attain high performance, it is very important to implement the arrangement of the first lens unit G1 within the range of the paraxial power distribution according to the present invention.

The second lens unit G2 may have either a negative refractive power or a positive refractive power. The lens arrangement of the second lens unit G2 is important for the correction of chromatic aberration when it is intended to achieve a high zoom ratio. In this example, the second lens unit G2 is formed from a biconcave negative lens and a biconvex positive lens. That is, in this example, the second lens unit G2 is formed from an air-spaced doublet.

Consequently, higher-order aberrations are produced by the air lens between the biconcave negative lens and the biconvex positive lens. The two lenses may be formed into a cemented doublet using an aspherical surface. When an aspherical surface is used for the biconcave negative lens, it is possible to expect that distortion can be corrected effectively.

An aperture stop is disposed on the image side of the second lens unit G2. By doing so, the lens system can maintain a certain degree of symmetry with respect to the aperture stop as a whole. Therefore, it is possible to obtain remarkable effects for correcting aberrations.

The third lens unit G3 includes a biconvex positive lens having a strong convex surface on the object side thereof and a cemented doublet consisting of a biconcave negative lens and a biconvex positive lens. The cemented doublet faces the biconvex positive lens closest to the object side across a space. An aspherical surface is used for the image-side surface of the biconvex positive lens closest to the object side. An aspherical surface is also used for the image-side surface of the cemented doublet. With this arrangement, off-axis aberration is corrected. Variations in the curvature of field due to zooming are corrected by independent movement of the second lens unit G2 and the third lens unit G3. Therefore, this four-unit zoom lens system can achieve a high zoom ratio very effectively.

The fourth lens unit G4 includes a negative meniscus lens having a concave surface directed toward the object side and a positive meniscus lens having a concave surface directed toward the object side. The fourth lens unit G4 further includes a biconcave negative lens. The negative meniscus lens and the positive meniscus lens form a cemented doublet. Aspherical surfaces are used for the object-side surface of the negative meniscus lens and the object-side surface of the biconcave negative lens, respectively. The biconcave negative lens has a deep concave surface directed toward the object side. For this lens, two solutions exist: in one case, it becomes a meniscus lens; in the other case, it becomes a biconcave lens. The lens may be formed by a biconcave lens, particularly when a surplus back focus is needed. The aspherical surface used for the object-side surface of the image-side biconcave negative lens has the effect of remarkably correcting aberrations in the vicinity of the wide-angle end. It is also possible to use an aspherical surface for the image-side surface of the cemented doublet. This aspherical surface has the effect of remarkably correcting off-axis field curvature at the wide-angle end. In this example, the telephoto ratio at the telephoto end is 0.958.

EXAMPLE 2

Figure 2:
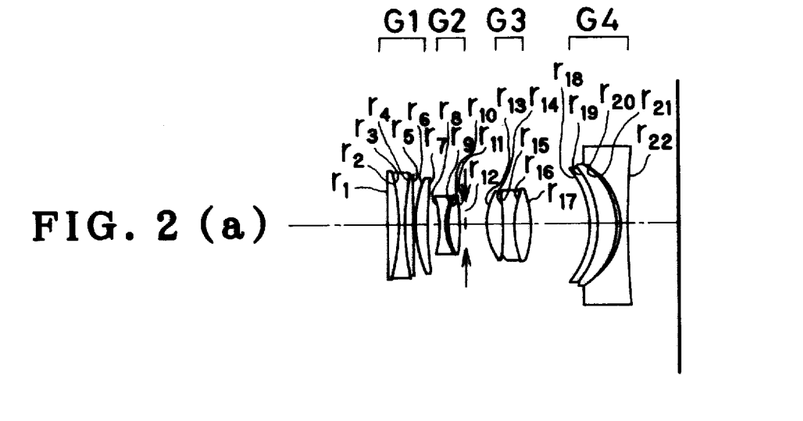
FIG. 2 is a sectional view of a lens system according to Example 2 of the present invention.

Example 2 is a wide-angle zoom lens system having a focal length ranging from 29.1 to 131.5 millimeters and an aperture ratio of 1:4.5 to 12.41. The lens arrangement of this example is shown in FIG. 2. A first lens unit G1 includes a biconvex positive lens and a doublet consisting of a biconcave negative lens and a positive meniscus lens having a convex surface directed toward the object side. The first lens unit G1 further includes a positive meniscus lens having a convex surface directed toward the object side. The second lens unit G2 is formed from an air-spaced doublet consisting of a biconcave negative lens and a biconvex positive lens. An aperture stop is disposed on the image side of the doublet. The third lens unit G3 includes a biconvex positive lens and a cemented doublet consisting of a biconcave negative lens and a biconvex positive lens. The fourth lens unit G4 includes a cemented doublet consisting of a negative meniscus lens having a concave surface directed toward the object side and a positive meniscus lens having a concave surface directed toward the object side. The fourth lens unit G4 further includes a biconcave negative lens. Aspherical surfaces are used for six surfaces: the image-side surface of the biconvex positive lens in the first lens unit G1; the object-side surface of the positive meniscus lens closest to the image side in the first lens unit G1; the image-side surface of the single biconvex positive lens in the third lens unit G3; the surface of the cemented doublet closest to the image side in the third lens unit G3; the object-side surface of the cemented doublet in the fourth lens unit G4; and the object-side surface of the biconcave negative lens in the fourth lens unit G4. Thus, the lens arrangement is approximately similar to that in Example 1. However, the telephoto ratio at the telephoto end is 0.86, which is smaller than the telephoto ratio in Example 1, i.e. 0.958. The field angle at the wide-angle end exceeds 70°, and the degree of difficulty in correcting aberrations is high. Therefore, the problem is how to reduce the telephoto ratio in comparison to conventional zoom lens systems in which the field angle at the wide-angle end is generally 60° or less. It will be understood that the air space between the first lens and the cemented doublet in the third lens unit G3 is smaller than in Example 1. However, the surfaces that use aspherical surfaces are the same as in Example 1.

EXAMPLE 3

Figure 3A:
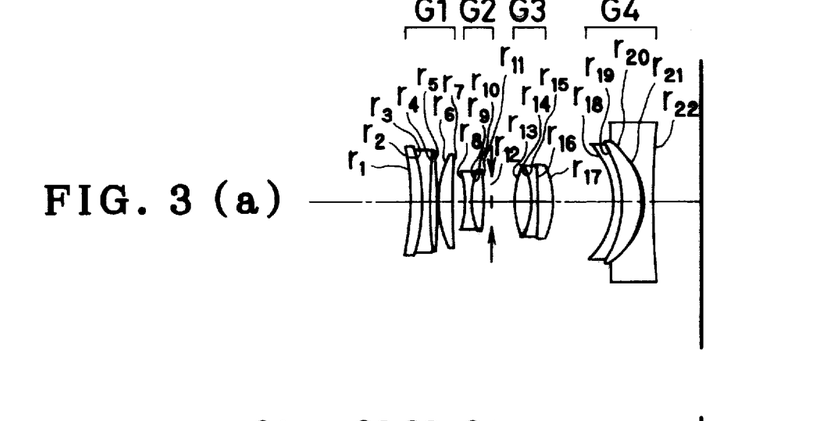
FIG. 3 is a sectional view of a lens system according to Example 3 of the present invention.
Figure 3B:
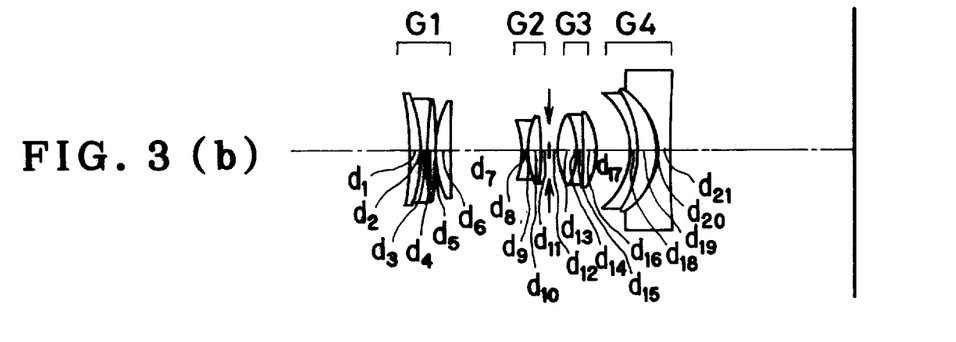
Figure 3C:
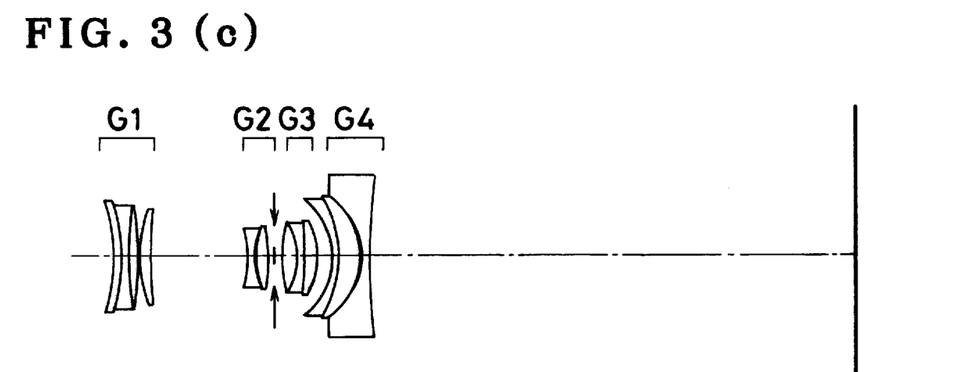
Figure 7:
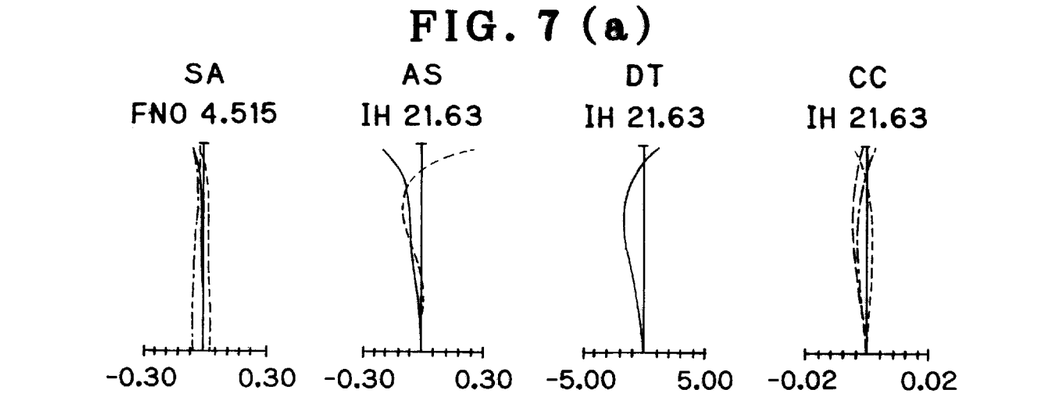
FIG. 7 is an aberrational diagram illustrating aberrations in Example 3 of the present invention.

Example 3 is a wide-angle zoom lens system having a focal length ranging from 29.1 to 131.5 millimeters and an aperture ratio of 1:4.5 to 12.54. The lens arrangement of this example is shown in FIG. 3. A first lens unit G1 includes a positive meniscus lens having a concave surface directed toward the object side and a doublet consisting of a biconcave negative lens and a biconvex positive lens. The first lens unit G1 further includes a positive meniscus lens having a convex surface directed toward the object side. The second lens unit G2 is formed from an air-spaced doublet consisting of a biconcave negative lens and a biconvex positive lens. An aperture stop is disposed on the image side of the doublet. The third lens unit G3 includes a biconvex positive lens and a cemented doublet consisting of a negative meniscus lens having a convex surface directed toward the image side and a positive meniscus lens having a convex surface directed toward the image side. The fourth lens unit G4 includes a cemented doublet consisting of a negative meniscus lens having a concave surface directed toward the object side and a positive meniscus lens having a concave surface directed toward the object side. The fourth lens unit G4 further includes a biconcave negative lens. Aspherical surfaces are used for six surfaces: the image-side surface of the positive meniscus lens closest to the object side in the first lens unit G1; the object-side surface of the positive meniscus lens closest to the image side in the first lens unit G1; the image-side surface of the single biconvex positive lens in the third lens unit G3; the surface of the cemented doublet closest to the image side in the third lens unit G3; the object-side surface of the cemented doublet in the fourth lens unit G4; and the object-side surface of the biconcave negative lens in the fourth lens unit G4. Thus, the lens arrangement is close to that in Example 2. However, the object-side surface of the first lens is formed from a considerably strong concave surface. It will be understood from the aberrational diagram shown in FIG. 7 that this example is favorably corrected for aberrations. The telephoto ratio at the telephoto end is 0.858.

EXAMPLE 4

Figure 4A:
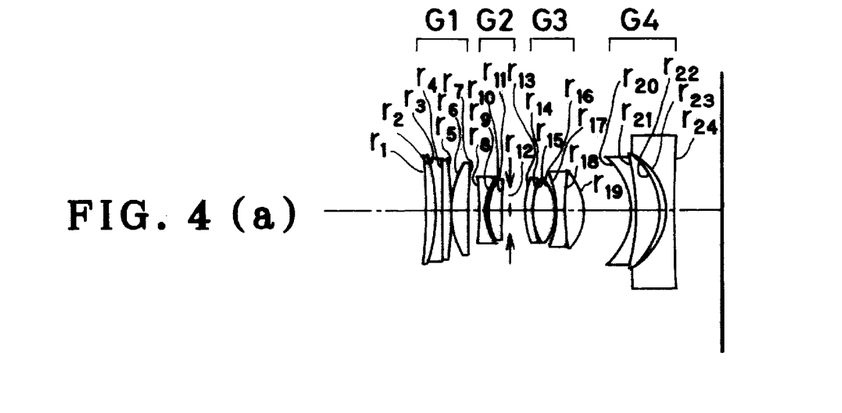
FIG. 4 is a sectional view of a lens system according to Example 4 of the present invention.
Figure 4B:
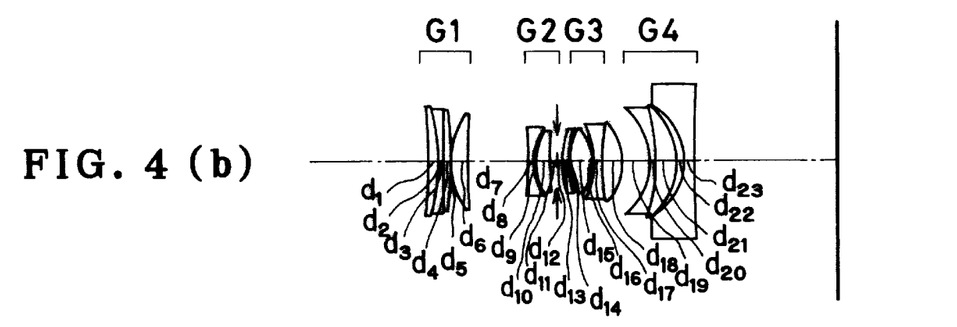
Figure 4C:
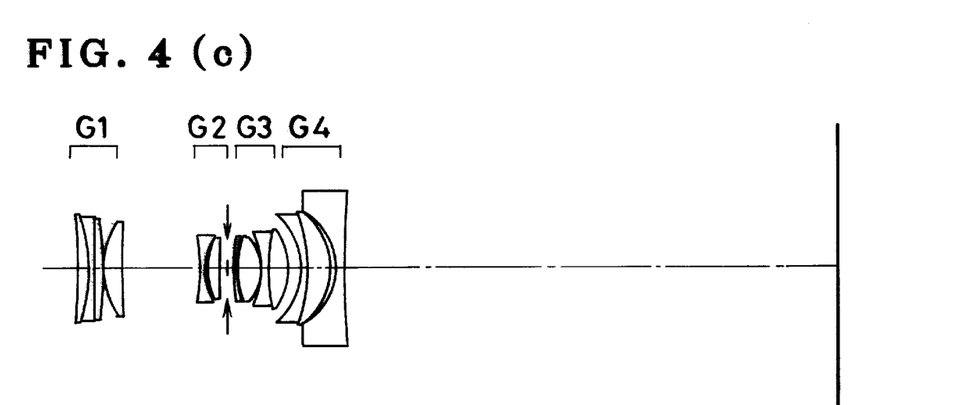
Figure 5:
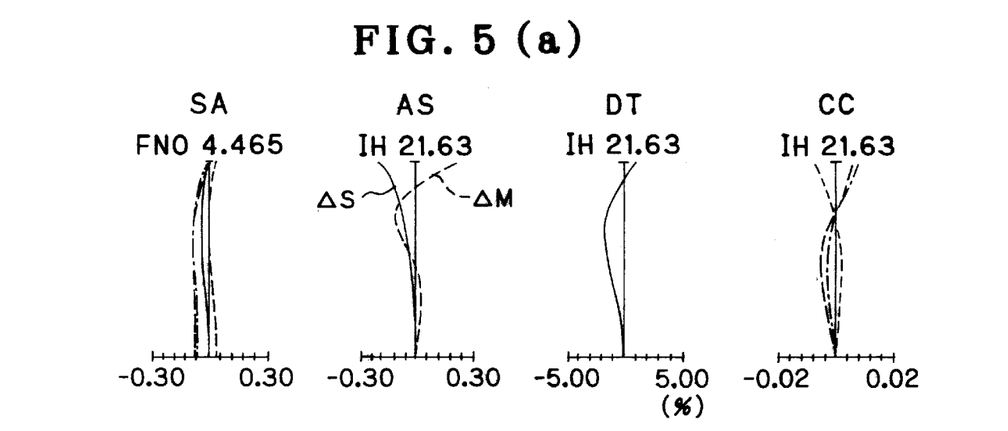
FIG. 5 is an aberrational diagram illustrating aberrations in Example 1 of the present invention.
Figure 6A:
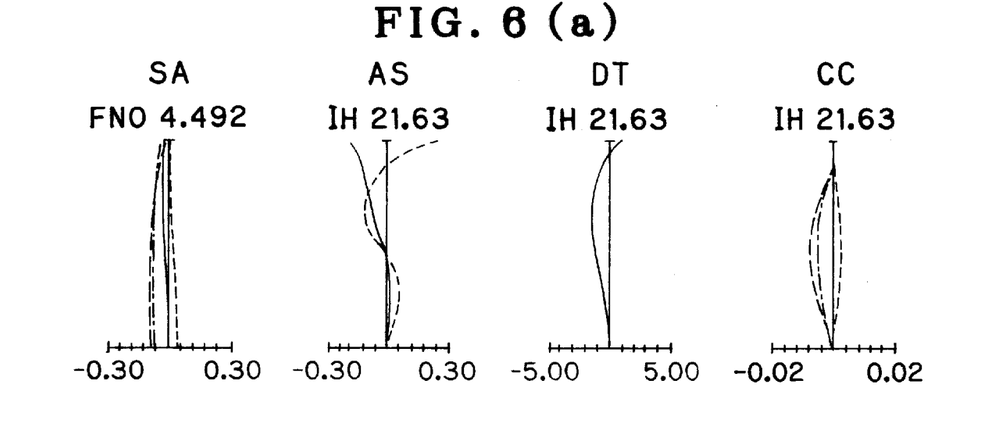
FIG. 6 is an aberrational diagram illustrating aberrations in Example 2 of the present invention.
Figure 6B:
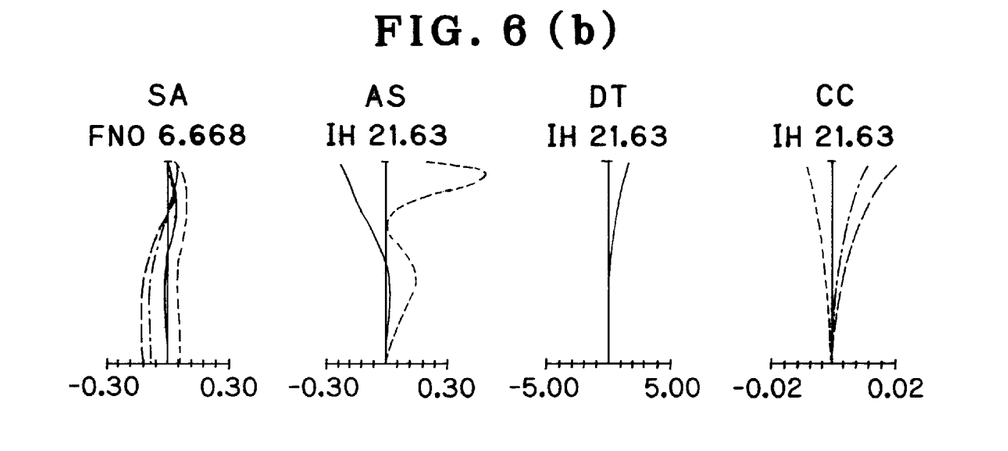
Figure 6C:
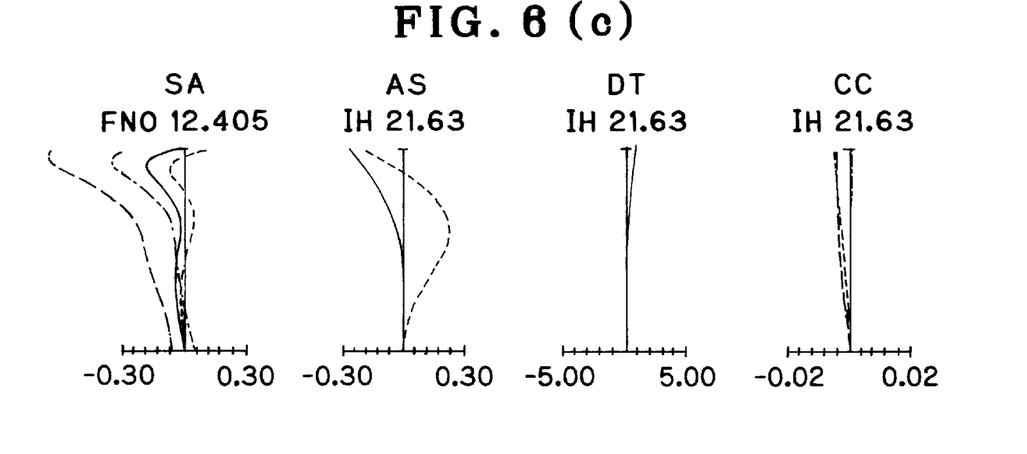
Figure 8:
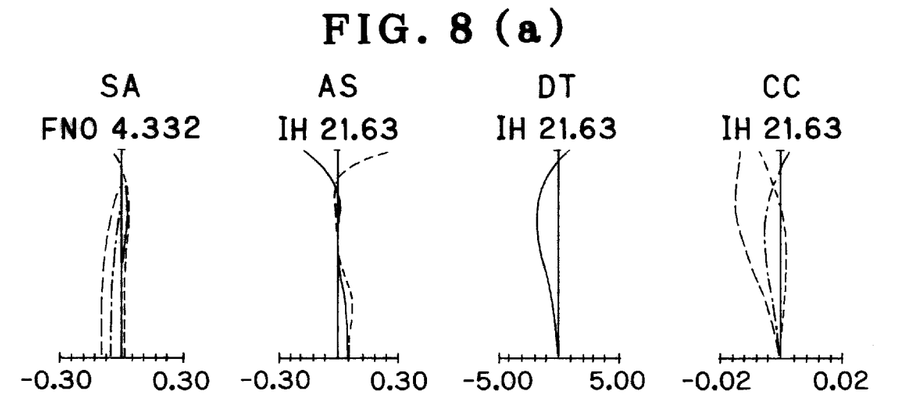
FIG. 8 is an aberrational diagram illustrating aberrations in Example 4 of the present invention.

Example 4 is a wide-angle zoom lens system with a high zoom ratio that has a focal length ranging from 29.1 to 175.5 millimeters and an aperture ratio of 1:4.33 to 13.95. The zoom ratio exceeds 6. The lens arrangement of this example is shown in FIG. 4. A first lens unit G1 includes a positive meniscus lens having a concave surface directed toward the object side and a doublet consisting of a biconcave negative lens and a biconvex positive lens. The first lens unit G1 further includes a positive meniscus lens having a convex surface directed toward the object side. The second lens unit G2 is formed from an air-spaced doublet consisting of a biconcave negative lens and a positive meniscus lens having a convex surface directed toward the object side. An aperture stop is disposed on the image side of the doublet. The third lens unit G3 includes a positive meniscus lens of small power having a convex surface directed toward the object side and a biconvex positive lens. The third lens unit G3 further includes a cemented doublet consisting of a biconcave negative lens and a biconvex positive lens. The fourth lens unit G4 includes a cemented doublet consisting of a negative meniscus lens having a concave surface directed toward the object side and a positive meniscus lens having a concave surface directed toward the object side. The fourth lens unit G4 further includes a biconcave negative lens. Aspherical surfaces are used for eight surfaces: the image-side surface of the positive meniscus lens closest to the object side in the first lens unit G1; the object-side surface of the positive meniscus lens closest to the image side in the first lens unit G1; the object-side surface of the positive meniscus lens in the second lens unit G2; the object-side surface of the positive meniscus lens closest to the object side in the third lens unit G3; the image-side surface of the biconvex positive lens in the third lens unit G3; the surface of the cemented doublet closest to the image side in the third lens unit G3; the object-side surface of the cemented doublet in the fourth lens unit G4; and the object-side surface of the biconcave negative lens in the fourth lens unit G4. Thus, the lens arrangement is similar to those in Examples 1 to 3. However, one single lens of small power is added to the third lens unit G3. Further, two aspherical surfaces are added: one for the object-side surface of the positive meniscus lens in the second lens unit G2; and another for the object-side surface of the first lens of small power in the third lens unit G3. In this example, the telephoto ratio at the telephoto end assumes a very small value, i.e. 0.684. According to the aberrational diagram shown in FIG. 8, it may be said that a problem still remains unsolved in terms of the correction of spherical aberration and astigmatism at the telephoto end. However, the zoom lens system is corrected for aberrations very favorably, considering the high-level specifications.

Numerical data in the above-described examples will be shown below. In the following: reference character f denotes the focal length of the entire system; $F_{NO}$ is F-number; $f_B$ is the back focus; $r_1, r_2 \ldots$ are the radii of curvature of lens surfaces; $d_1, d_2 \ldots$ are the spaces between adjacent lens surfaces; $n_{d1}, n_{d2} \ldots$ are the refractive indices of the lenses for the spectral d-line; and $v_{d1}, v_{d2} \ldots$ are the Abbe's numbers of the lenses. Assuming that x is taken in the direction of the optical axis, where the direction of travel of light is defined as a positive direction, and y is taken in a direction perpendicular to the optical axis, an aspherical configuration is expressed by $$x=(y^2/r)/[1+\{1-(K+1)(y/r)^2\}^{1/2}]+A_4y^4+A_6y^6+A_8y^8+A_{10}y^{10}$$

where r is a paraxial curvature radius; K is a conical coefficient; and $A_4, A_6, A_8$ and $A_{10}$ are 4th-, 6th-, 8th- and 10th-order aspherical coefficients, respectively.

EXAMPLE 1

$f = 29.100 \sim 64.999 \sim 114.997$
$F_{NO} = 4.465 \sim 8.924 \sim 15.214$
$f_B = 7.800 \sim 35.651 \sim 73.668$

| | | | | | |
|---|---|---|---|---|---|
| $r_1 =$ | −60.9583 | $d_1 = 1.5500$ | $n_{d1} = 1.49700$ | $v_{d1} = 81.54$ |
| $r_2 =$ | −30.6163(Aspheric) | $d_2 = 0.1000$ | | |
| $r_3 =$ | −35.9542 | $d_3 = 0.6500$ | $n_{d2} = 1.81835$ | $v_{d2} = 31.25$ |
| $r_4 =$ | 26.1973 | $d_4 = 1.5500$ | $n_{d3} = 1.80518$ | $v_{d3} = 25.42$ |
| $r_5 =$ | 163.2541 | $d_5 = 0.1000$ | | |
| $r_6 =$ | 14.4671(Aspheric) | $d_6 = 1.7712$ | $n_{d4} = 1.78800$ | $v_{d4} = 47.37$ |
| $r_7 =$ | 34.3824 | $d_7 =$ (Variable) | | |
| $r_8 =$ | −14.9121 | $d_8 = 1.0000$ | $n_{d5} = 1.80100$ | $v_{d5} = 34.97$ |
| $r_9 =$ | 11.5354 | $d_9 = 0.2937$ | | |
| $r_{10} =$ | 14.1635 | $d_{10} = 1.8252$ | $n_{d6} = 1.78470$ | $v_{d6} = 26.29$ |
| $r_{11} =$ | −22.0243 | $d_{11} = 0.8841$ | | |
| $r_{12} =$ | ∞ (Stop) | $d_{12} =$ (Variable) | | |
| $r_{13} =$ | 10.7374 | $d_{13} = 2.1563$ | $n_{d7} = 1.48749$ | $v_{d7} = 70.23$ |
| $r_{14} =$ | −56.1446(Aspheric) | $d_{14} = 1.5243$ | | |
| $r_{15} =$ | −198.3484 | $d_{15} = 1.0000$ | $n_{d8} = 1.80518$ | $v_{d8} = 25.42$ |
| $r_{16} =$ | 11.1282 | $d_{16} = 2.6888$ | $n_{d9} = 1.58267$ | $v_{d9} = 46.42$ |
| $r_{17} =$ | −14.8104(Aspheric) | $d_{17} =$ (Variable) | | |
| $r_{18} =$ | −10.7200(Aspheric) | $d_{18} = 1.0000$ | $n_{d10} = 1.69680$ | $v_{d10} = 55.53$ |
| $r_{19} =$ | −20.6408 | $d_{19} = 3.2243$ | $n_{d11} = 1.84666$ | $v_{d11} = 23.78$ |
| $r_{20} =$ | −11.8992 | $d_{20} = 0.2290$ | | |
| $r_{21} =$ | −12.6565(Aspheric) | $d_{21} = 1.2000$ | $n_{d12} = 1.74100$ | $v_{d12} = 52.64$ |
| $r_{22} =$ | 110.6860 | | | |

Zooming Spaces

| f | 29.100 | 64.999 | 114.997 |
|---|---|---|---|
| $d_7$ | 2.0000 | 8.8087 | 10.8378 |
| $d_{12}$ | 1.1371 | 1.6450 | 0.7700 |
| $d_{17}$ | 9.0160 | 4.0613 | 2.2023 |

Aspherical Coefficients

2nd surface
K=0
$A_4 = -1.3688 \times 10^{-5}$
$A_6 = 3.6198 \times 10^{-9}$
$A_8 = 3.2152 \times 10^{-9}$
$A_{10} = -3.6846 \times 10^{-11}$ 6th surface
K=0
$A_4 = -1.0954 \times 10^{-5}$
$A_6 = 7.1218 \times 10^{-9}$
$A_8 = 2.4759 \times 10^{-9}$
$A_{10} = -2.8532 \times 10^{-11}$ 14th surface
K=0
$A_4 = -8.1462 \times 10^{-5}$
$A_6 = -2.2500 \times 10^{-6}$
$A_8 = -1.8770 \times 10^{-8}$
$A_{10} = 4.8543 \times 10^{-10}$ 17th surface
K=0
$A_4 = 2.7459 \times 10^{-4}$
$A_6 = 3.6486 \times 10^{-6}$
$A_8 = 2.8440 \times 10^{-8}$
$A_{10} = 2.0101 \times 10^{-9}$ 18th surface
K=0
$A_4 = 2.1043 \times 10^{-4}$
$A_6 = 1.4156 \times 10^{-6}$
$A_8 = -1.5481 \times 10^{-8}$
$A_{10} = -1.0481 \times 10^{-10}$ 21th surface
K=0
$A_4 = -3.7836 \times 10^{-5}$
$A_6 = -3.0347 \times 10^{-7}$
$A_8 = -5.0482 \times 10^{-9}$
$A_{10} = 1.1249 \times 10^{-10}$

EXAMPLE 2

$f = 29.100 \sim 61.999 \sim 131.497$
$F_{NO} = 4.492 \sim 6.668 \sim 12.405$
$f_B = 7.800 \sim 28.153 \sim 72.899$

| | | | | | |
|---|---|---|---|---|---|
| $r_1 =$ | 2767.1061 | $d_1 = 1.5500$ | $n_{d1} = 1.49700$ | $v_{d1} = 81.54$ |
| $r_2 =$ | −32.3862(Aspheric) | $d_2 = 0.1000$ | | |
| $r_3 =$ | −39.8529 | $d_3 = 0.6500$ | $n_{d2} = 1.81612$ | $v_{d2} = 32.05$ |
| $r_4 =$ | 28.4860 | $d_4 = 1.5500$ | $n_{d3} = 1.80518$ | $v_{d3} = 25.42$ |
| $r_5 =$ | 128.7841 | $d_5 = 0.1000$ | | |
| $r_6 =$ | 16.7685(Aspheric) | $d_6 = 1.7154$ | $n_{d4} = 1.78800$ | $v_{d4} = 47.37$ |
| $r_7 =$ | 38.4608 | $d_7 =$ (Variable) | | |
| $r_8 =$ | −17.5800 | $d_8 = 1.0000$ | $n_{d5} = 1.80100$ | $v_{d5} = 34.97$ |
| $r_9 =$ | 10.3362 | $d_9 = 0.2806$ | | |
| $r_{10} =$ | 12.2090 | $d_{10} = 1.7694$ | $n_{d6} = 1.78470$ | $v_{d6} = 26.29$ |
| $r_{11} =$ | −29.6855 | $d_{11} = 0.9862$ | | |
| $r_{12} =$ | ∞ (Stop) | $d_{12} =$ (Variable) | | |
| $r_{13} =$ | 11.0341 | $d_{13} = 2.3016$ | $n_{d7} = 1.48749$ | $v_{d7} = 70.23$ |
| $r_{14} =$ | −124.0422 (Aspheric) | $d_{14} = 0.4144$ | | |
| $r_{15} =$ | $-1.690 \times 10^{+5}$ | $d_{15} = 1.0000$ | $n_{d8} = 1.80518$ | $v_{d8} = 25.42$ |
| $r_{16} =$ | 12.0966 | $d_{16} = 2.6340$ | $n_{d9} = 1.58267$ | $v_{d9} = 46.42$ |
| $r_{17} =$ | −14.0589(Aspheric) | d17 = (Variable) | | |
| $r_{18} =$ | −9.4504(Aspheric) | $d_{18} = 1.0000$ | $n_{d10} = 1.69680$ | $v_{d10} = 55.53$ |
| $r_{19} =$ | −14.5398 | $d_{19} = 3.1620$ | $n_{d11} = 1.84666$ | $v_{d11} = 23.78$ |
| $r_{20} =$ | −10.3182 | $d_{20} = 0.3737$ | | |
| $r_{21} =$ | −11.3431(Aspheric) | $d_{21} = 1.2000$ | $n_{d12} = 1.74100$ | $v_{d12} = 52.64$ |
| $r_{22} =$ | 152.4572 | | | |

Zooming Spaces

| f | 29.100 | 61.999 | 131.497 |
|---|---|---|---|
| $d_7$ | 2.0000 | 12.0749 | 15.1093 |
| $d_{12}$ | 3.1451 | 2.7777 | 0.7700 |
| $d_{17}$ | 9.0377 | 4.6757 | 2.2023 |

Aspherical Coefficients

2nd surface
K=0
$A_4 = 2.2732 \times 10^{-5}$
$A_6 = -4.7938 \times 10^{-7}$
$A_8 = 5.3188 \times 10^{-9}$
$A_{10} = -2.1765 \times 10^{-11}$ 6th surface
K=0
$A_4 = 1.1770 \times 10^{-5}$
$A_6 = -2.8462 \times 10^{-7}$
$A_8 = 2.4782 \times 10^{-9}$
$A_{10} = -2.7855 \times 10^{-12}$ 14th surface
K=0
$A_4 = -2.0616 \times 10^{-4}$
$A_6 = -1.6151 \times 10^{-6}$
$A_8 = -1.8509 \times 10^{-7}$
$A_{10} = 4.2047 \times 10^{-9}$ 17th surface
K=0
  $A_4=3.7747\times10^{-4}$
  $A_6=2.4470\times10^{-6}$
  $A_8=2.0211\times10^{-7}$
  $A_{10}=-1.1586\times10^{-9}$
18th surface
K=0
  $A_4=3.3814\times10^{-4}$
  $A_6=1.6817\times10^{-6}$
  $A_8=-3.1906\times10^{-8}$
  $A_{10}=2.6054\times10^{-10}$
21th surface
K=0
  $A_4=\times1.0182-10^{-4}$
  $A_6=-1.0148\times10^{-6}$
  $A_8=3.2467\times10^{-9}$
  $A_{10}=1.3932\times10^{-11}$

EXAMPLE 3

$f=29.100\sim61.999\sim131.496$
$F_{NO}=4.515\sim6.639\sim12.536$
$f_B=7.800\sim28.471\sim73.614$

| | | | |
|---|---|---|---|
| $r_1=$ | −30.7103 | $d_1=1.5500$ | $n_{d1}=1.49700$ $v_{d1}=81.54$ |
| $r_2=$ | −23.5661(Aspheric) | $d_2=0.1000$ | |
| $r_3=$ | −26.2225 | $d_3=0.6500$ | $n_{d2}=1.82999$ $v_{d2}=27.68$ |
| $r_4=$ | 53.0653 | $d_4=1.5500$ | $n_{d3}=1.80518$ $v_{d3}=25.42$ |
| $r_5=$ | −69.6393 | $d_5=0.1000$ | |
| $r_6=$ | 18.3768(Aspheric) | $d_6=1.8275$ | $n_{d4}=1.78800$ $v_{d4}=4737$ |
| $r_7=$ | 72.8696 | $d_7=$ (Variable) | |
| $r_8=$ | −19.1960 | $d_8=1.0000$ | $n_{d5}=0.80100$ $v_{d5}=3497$ |
| $r_9=$ | 11.0920 | $d_9=0.1768$ | |
| $r_{10}=$ | 11.1315 | $d_{10}=1.8863$ | $n_{d6}=1.78470$ $v_{d6}=26.29$ |
| $r_{11}=$ | −33.8884 | $d_{11}=0.9949$ | |
| $r_{12}=$ | ∞ (Stop) | $d_{12}=$ (Variable) | |
| $r_{13}=$ | 14.0262 | $d_{13}=2.6939$ | $n_{d7}=1.48749$ $v_{d7}=70.23$ |
| $r_{14}=$ | −11.4252(Aspheric) | $d_{14}=0.1000$ | |
| $r_{15}=$ | −9.8457 | $d_{15}=1.0000$ | $n_{d8}=1.80518$ $v_{d8}=25.42$ |
| $r_{16}=$ | −50.3429 | $d_{16}=2.1182$ | $n_{d9}=1.58267$ $v_{d9}=46.42$ |
| $r_{17}=$ | −9.6350(Aspheric) | $d_{17}=$ (Variable) | |
| $r_{18}=$ | −9.0516(Aspheric) | $d_{18}=1.0000$ | $n_{d10}=1.69680$ $v_{d10}=55.53$ |
| $r_{19}=$ | −16.0034 | $d_{19}=3.2074$ | $n_{d11}=1.84666$ $v_{d11}=23.78$ |
| $r_{20}=$ | −10.5537 | $d_{20}=0.2151$ | |
| $r_{21}=$ | −12.2393(Aspheric) | $d_{21}=1.2000$ | $n_{d12}=1.74100$ $v_{d12}=52.64$ |
| $r_{22}=$ | 110.4828 | | |

Zooming Spaces

| f | 29.100 | 61.999 | 131.496 |
|---|---|---|---|
| $d_7$ | 2.0000 | 11.1634 | 14.8109 |
| $d_{12}$ | 3.2736 | 1.5214 | 0.7700 |
| $d_{17}$ | 9.3264 | 4.8147 | 2.2023 |

Aspherical Coefficients
2nd surface
K=0
  $A_4=1.4130\times10^{-6}$
  $A_6=-2.4734\times10^{-7}$
  $A_8=4.6976\times10^{-9}$
  $A_{10}=-2.8838\times10^{-11}$
6th surface
K=0
  $A_4=3.0320\times10^{-6}$
  $A_6=-1.5313\times10^{-7}$
  $A_8=2.8908\times10^{-9}$
  $A_{10}=-1.7181\times10^{-11}$
14th surface
K=0
  $A_4=-1.5581\times10^{-5}$
  $A_6=1.4199\times10^{-6}$
  $A_8=-3.2394\times10^{-7}$
  $A_{10}=6.2247\times10^{-9}$
17th surface
K=0
  $A_4=2.1410\times10^{-4}$
  $A_6=-1.1316\times10^{-6}$
  $A_8=1.7412\times10^{-7}$
  $A_{10}=-2.3510\times10^{-9}$
18th surface
K=0
  $A_4=3.7883\times10^{-4}$
  $A_6=-1.0046\times10^{-6}$
  $A_8=8.4849\times10^{-9}$
  $A_{10}=-7.5380\times10^{-11}$
21th surface
K=0
  $A_4=-1.4558\times10^{-4}$
  $A_6=-3.1844\times10^{-7}$
  $A_8=1.2480\times10^{-10}$
  $A_{10}=3.2167\times10{-11}$

EXAMPLE 4

$f=29.098\sim63.890\sim175.502$
$F_{NO}=4.332\sim6.291\sim13.947$
$f_B=7.799\sim22.982\sim78.118$

| | | | |
|---|---|---|---|
| $r_1=$ | −54.7483 | $d_1=1.5500$ | $n_{d1}=1.45600$ $v_{d1}=90.33$ |
| $r_2=$ | −25.3820(Aspheric) | $d_2=0.1000$ | |
| $r_3=$ | −27.9942 | $d_3=0.6500$ | $n_{d2}=1.80100$ $v_{d2}=34.97$ |
| $r_4=$ | 737.0046 | $d_4=1.5500$ | $n_{d3}=1.57099$ $v_{d3}=50.80$ |
| $r_5=$ | −58.8812 | $d_5=0.1000$ | |
| $r_6=$ | 13.6043(Aspheric) | $d_6=2.4847$ | $n_{d4}=1.51823$ $v_{d4}=58.90$ |
| $r_7=$ | 89.7212 | $d_7=$ (Variable) | |
| $r_8=$ | −38.9840 | $d_8=1.0000$ | $n_{d5}=1.78800$ $v_{d5}=47.37$ |
| $r_9=$ | 8.5653 | $d_9=0.4116$ | |
| $r_{10}=$ | 9.7826(Aspheric) | $d_{10}=1.6941$ | $n_{d6}=1.80518$ $v_{d6}=25.42$ |
| $r_{11}=$ | 36.5623 | $d_{11}=1.4008$ | |
| $r_{12}=$ | ∞(Stop) | $d_{12}=$ (Variable) | |
| $r_{13}=$ | 15.0950(Aspheric) | $d_{13}=1.0000$ | $n_{d7}=1.66680$ $v_{d7}=33.05$ |
| $r_{14}=$ | 19.6307 | $d_{14}=0.3933$ | |
| $r_{15}=$ | 15.7981 | $d_{15}=3.2500$ | $n_{d8}=1.49700$ $v_{d8}=81.54$ |
| $r_{16}=$ | −7.4752(Aspheric) | $d_{16}=0.1000$ | |
| $r_{17}=$ | −11.8415 | $d_{17}=1.0000$ | $n_{d9}=1.80100$ $v_{d9}=34.97$ |
| $r_{18}=$ | 26.8643 | $d_{18}=3.2754$ | $n_{d10}=1.53996$ $v_{d10}=59.46$ |
| $r_{19}=$ | −8.6669(Aspheric) | $d_{19}=$ (Variable) | |
| $r_{20}=$ | −8.5087(Aspheric) | $d_{20}=1.0000$ | $n_{d11}=1.78800$ $v_{d11}=47.37$ |
| $r_{21}=$ | −22.9097 | $d_{21}=3.6156$ | $n_{d12}=1.84666$ $v_{d12}=23.78$ |
| $r_{22}=$ | −10.2703 | $d_{22}=0.7869$ | |
| $r_{23}=$ | −9.7278(Aspheric) | $d_{23}=1.2000$ | $n_{d13}=1.78800$ $v_{d13}=47.37$ |
| $r_{24}=$ | 149.5326 | | |

Zooming Spaces

| f | 29.098 | 63.890 | 175.502 |
|---|---|---|---|
| $d_7$ | 2.0000 | 9.7400 | 12.3486 |
| $d_{12}$ | 2.6224 | 1.0617 | 0.7700 |
| $d_{19}$ | 7.4849 | 4.4090 | 2.2023 |

Aspherical Coefficients

2nd surface

K=0

$A_4=6.5267\times10^{-6}$
$A_6=-5.9990\times10^{-9}$
$A_8=-7.0640\times10^{-10}$
$A_{10}=7.4473\times10^{-12}$ 6th surface

K=0

$A_4=-5.3474\times10^{-6}$
$A_6=-4.8261\times10^{-9}$
$A_8=-1.7180\times10^{-9}$
$A_{10}=1.3001\times10^{-11}$ 10th surface

K=0

$A_4=6.7086\times10^{-5}$
$A_6=-3.4940\times10^{-6}$
$A_8=2.0284\times10^{-7}$
$A_{10}=-5.8999\times10^{-9}$ 13th surface

K=0

$A_4=-2.9921\times10^{-4}$
$A_6=-1.6271\times10^{-6}$
$A_8=-2.6192\times10^{-7}$
$A_{10}=-1.0094\times10^{-9}$ 16th surface

K=0

$A_4=3.8418\times10^{-4}$
$A_6=-8.7877\times10^{-7}$
$A_8=-2.5688\times10^{-7}$
$A_{10}=4.5783\times10^{-9}$ 19th surface

K=0

$A_4=6.5781\times10^{-5}$
$A_6=1.6308\times10^{-7}$
$A_8=3.3452\times10^{-8}$
$A_{10}=-5.3648\times10^{-10}$ 20th surface

K=0

$A_4=4.4479\times10^{-4}$
$A_6=-1.2090\times10^{-6}$
$A_8=-5.4574\times10^{-12}$
$A_{10}=-9.2936\times10^{-11}$ 23th surface

K=0

$A_4=-1.1586\times10^{-4}$
$A_6=7.7442\times10^{-7}$
$A_8=-6.2120\times-9$
$A_{10}=1.9423\times10^{-10}$ FIGS. 5 to 8 graphically show aberrations in the above-described Examples 1 to 4. In these aberrational diagrams, parts (a), (b) and (c) show spherical aberration SA, astigmatism AS, distortion DT and lateral chromatic aberration CC at a wide-angle end, an intermediate position, and a telephoto end, respectively. In the diagrams, "IH" denotes image height.

The value of the conditions (1) to (4) in the above-described Examples 1 to 4 are as follows:

|  | $f_1/f_W$ | $|f_4|/f_W$ | $\Delta X_{4T}/f_T$ | $\beta_{4T}/\beta_{4W}$ |
|---|---|---|---|---|
| Example 1 | 2.6520 | 0.5225 | 0.5730 | 3.5250 |
| Example 2 | 2.1179 | 0.4891 | 0.4951 | 3.5930 |
| Example 3 | 1.8310 | 0.4812 | 0.5005 | 3.6189 |
| Example 4 | 1.4088 | 0.3439 | 0.4000 | 4.3866 |

In the above-described examples, the values of $f_1/f_W$, $|f_4|/f_W$, $\Delta t_{4T}/f_T$, and $\beta_{4T}/\beta_{4W}$ are as shown in the above table, which are within the respective ranges shown below. Therefore, the values are within the ranges defined by the conditions (1) to (4). Accordingly, in the zoom lens system, the overall length of the lens system is favorably short not only when the lens system is in the collapsed storage position or at the wide-angle end but also when it is at the telephoto end despite the fact that the zoom lens system has a high zoom ratio. Moreover, the zoom lens system is favorably corrected for aberrations.

$1.0<f_1/f_W<3.0$
$0.3<|f_4|/f_W<0.6$
$0.3<\Delta X_{4T}/f_T<0.6$
$3.0<\beta_{4T}/\beta_{4W}<5.0$ It should be noted that when a doublet is formed from a positive lens and a negative lens in the present invention, the doublet may be arranged such that the two lenses face each other across a small air space (air spaced doublet or non-cemented doublet) or the two lenses are physically stuck fast to each other with an adhesive or the like (cemented doublet). Either of the doublet structures may be selected by taking into consideration the overall lens arrangement of the zoom lens system, the balance of aberration correction, the decentration error sensitivity, etc.

Although the wide-angle zoom lens system according to the present invention is a zoom lens system in which the magnification varies continuously from the wide-angle end to the telephoto end, the present invention is also applicable to a zoom lens system that is used with a magnification varied discontinuously, e.g. at the wide-angle end and the telephoto end, or at the wide-angle end, an intermediate position and the telephoto end.

In addition, the object-side concave surface of the object-side negative lens in the fourth lens unit has the smallest radius of curvature in the fourth lens unit, and the outer diameter of the fourth lens unit is larger than the outer diameter of the third lens unit. Therefore, when the third lens unit and the fourth lens unit come closest to each other, the vertex of the lens surface closest to the image side in the third lens unit is located closer to the image side than the periphery (the intersection between the chamfered surface and the spherical surface) of the lens closest to the object side in the fourth lens unit. Accordingly, the lens closest to the image side in the third lens unit can move into a space formed by the concave surface of the object-side negative lens in the fourth lens unit. Consequently, it is possible to shorten the overall length of the lens system at the telephoto end and also possible to reduce the size of the camera when the lens system is in the collapsed storage position.

In addition, the zoom lens system according to the present invention has a zoom ratio of 3 or more and a telephoto ratio of about 0.8. Examples of the present invention disclose zoom lens systems having a zoom ratio of 3.95 to 6.03 and a telephoto ratio of 0.68 to 0.96.

As will be clear from the foregoing description, the present invention found an appropriate refractive power distribution among solutions to a four-unit zoom lens system having, in order from the object side, a lens unit of positive refractive power, a lens unit of negative refractive power, a lens unit of positive refractive power, and a lens unit of negative refractive power, which refractive power distribution allows the amount of lens movement for zooming from the wide-angle end to the telephoto end to be minimized despite the fact that the zoom lens system includes a wide-angle position and has a high zoom ratio. In addition, the present invention solved the problem of how to ensure an aberration-correcting surface, which arises from the refractive power distribution, by finding an appropriate lens arrangement and a method of effectively utilizing an aspherical surface.

I claim:

1. A wide-angle zoom lens system comprising, in order from an object side thereof:

a first lens unit of positive refractive power;

a second lens unit of negative refractive power;

a third lens unit of positive refractive power; and a fourth lens unit of negative refractive power;

wherein when said wide-angle zoom lens system is zoomed from a wide-angle side to a telephoto side, each of said lens units moves toward the object side such that a space between said first lens unit and said second lens unit increases, whereas a space between said third lens unit and said fourth lens unit decreases, and wherein the following conditions are satisfied:

$$0.7 < f_1/f_W < 3.5 \quad (1)$$

$$0.15 < |f_4|/f_W < 0.7 \quad (2)$$

$$0.2 < \Delta X_{4T}/f_T < 0.65 \quad (3)$$

$$2.5 < \beta_{4T}/\beta_{4W} < 6.0 \quad (4)$$

where $f_1$ is a focal length of said first lens unit; $f_W$ is a focal length at a wide-angle end of said wide-angle zoom lens system; $f_4$ is a focal length of said fourth lens unit; $f_T$ is a focal length at a telephoto end of said wide-angle zoom lens system; $\Delta X_{4T}$ is an amount of movement of said fourth lens unit for zooming from the wide-angle end to the telephoto end; $\beta_{4T}$ is a lateral magnification at the telephoto end of said fourth lens unit; and $\beta_{4W}$ is a lateral magnification at the wide-angle end of said fourth lens unit.

2. A wide-angle zoom lens system according to claim 1, wherein said first lens unit includes at least one positive lens and one doublet consisting of a positive lens and a negative lens, and said second lens unit includes at least one negative lens, and further said third lens unit includes at least one doublet consisting of a negative lens and a positive lens, and further said fourth lens unit includes at least a negative lens and a positive lens.

3. A wide-angle zoom lens system according to claim 2, wherein said second lens unit includes, in order from an object side thereof, a negative lens, a positive lens, and an aperture stop.

4. A wide-angle zoom lens system according to claim 2, wherein said negative lens in said fourth lens unit is a first negative lens having a strong concave surface directed toward the object side, said first negative lens forming a doublet in combination with a single positive lens, said fourth lens unit further having a second negative lens on an image side of said doublet, said second negative lens having a strong concave surface directed toward the object side.

5. A wide-angle zoom lens system according to claim 4, wherein aspherical surfaces are provided on respective object-side surfaces of said first and second negative lenses in said fourth lens unit.

6. A wide-angle zoom lens system according to claim 4, wherein a thickness on an optical axis of said positive lens in said fourth lens unit is from 1.4 to 1.6 times as large as a sum total of thicknesses on an optical axis of said first and second negative lenses.

7. A wide-angle zoom lens system according to claim 1, wherein said first lens unit has at least one aspherical surface.

8. A wide-angle zoom lens system according to claim 7, wherein a positive lens closest to the object side in said first lens unit has an aspherical surface, and a positive lens closest to an image side in said first lens unit has an aspherical surface.

9. A wide-angle zoom lens system according to claim 1, wherein said second lens unit has at least one aspherical surface.

10. A wide-angle zoom lens system according to claim 1, wherein said third lens unit has at least one aspherical surface.

11. A wide-angle zoom lens system according to claim 10, wherein said third lens unit has aspherical surfaces provided on an image-side surface of a biconvex lens and a surface of a cemented lens that is closest to an image side, respectively.

12. A wide-angle zoom lens system according to claim 1, wherein said fourth lens unit has at least one aspherical surface.

13. A wide-angle zoom lens system according to claim 1, wherein a total number of lens elements constituting said first, second, third and fourth lens units is 12.

14. A wide-angle zoom lens system according to claim 1, wherein a surface closest to an image side in said first lens unit and a surface closest to the object side in said second lens unit are concave surfaces facing each other.

15. A wide-angle zoom lens system according to claim 1, which has a zoom ratio not lower than 3 and a telephoto ratio not higher than 0.96.

16. A wide-angle zoom lens system according to claim 1, wherein peripheries of lenses in said fourth lens unit are in contact with each other.

17. A wide-angle zoom lens system comprising, in order from an object side thereof:

a first lens unit of positive refractive power;

a second lens unit of negative refractive power;

a third lens unit of positive refractive power; and a fourth lens unit of negative refractive power;

wherein when said wide-angle zoom lens system is zoomed from a wide-angle end to a telephoto end, each of said lens units moves toward the object side such that a space between said first lens unit and said second lens unit increases, whereas a space between said third lens unit and said fourth lens unit decreases, and wherein a zoom ratio is at least 3, and a telephoto ratio is in a range of from 0.68 to 0.96.

18. A wide-angle zoom lens system comprising, in order from an object side thereof:

a first lens unit of positive refractive power;

a second lens unit of negative refractive power;

a third lens unit of positive refractive power; and a fourth lens unit of negative refractive power;

wherein when said wide-angle zoom lens system is zoomed from a wide-angle end to a telephoto end, each of said lens units moves toward the object side such that a space between said first lens unit and said second lens unit increases, whereas a space between said third lens unit and said fourth lens unit decreases;

said fourth lens unit consisting of, in order from an object side thereof, a negative meniscus lens, a positive lens, and a negative lens, wherein a radius of curvature of an object-side surface of said negative meniscus lens is smaller than a radius of curvature of an object-side surface of said negative lens.

19. A wide-angle zoom lens system comprising, in order from an object side thereof:

a first lens unit of positive refractive power;

a second lens unit of negative refractive power;

a third lens unit of positive refractive power; and a fourth lens unit of negative refractive power;

wherein when said wide-angle zoom lens system is zoomed from a wide-angle end to a telephoto end, each of said lens units moves toward the object side such that a space between said first lens unit and said second lens unit increases, whereas a space between said third lens unit and said fourth unit decreases;

said fourth lens unit consisting of, in order from an object side thereof, a negative meniscus lens, a positive lens, and a negative lens, wherein a thickness on an optical axis of said positive lens is greater than a thickness on an optical axis of each of said negative lens and said negative meniscus lens.

* * * * *